Nov. 25, 1969 O. SCHARLI 3,480,842
SEMICONDUCTOR STRUCTURE DISC HAVING PN JUNCTION WITH IMPROVED HEAT AND ELECTRICAL CONDUCTIVITY AT OUTER LAYER
Filed Jan. 24, 1967
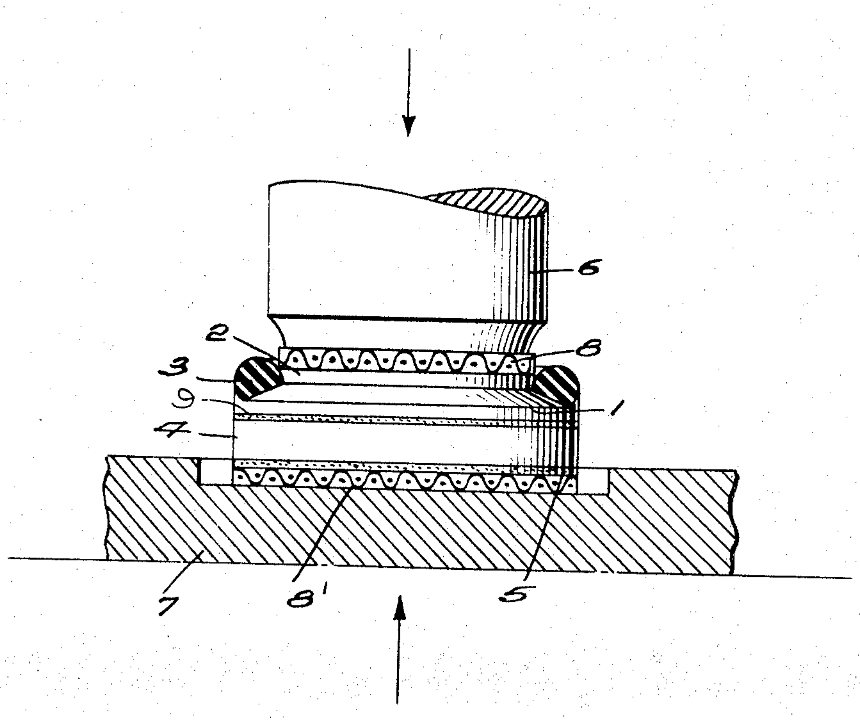
INVENTOR
Otto Schärli
BY Pierce, Scheffler & Parker
ATTORNEYS

United States Patent Office 3,480,842

Patented Nov. 25, 1969

3,480,842

SEMICONDUCTOR STRUCTURE DISC HAVING PN JUNCTION WITH IMPROVED HEAT AND ELECTRICAL CONDUCTIVITY AT OUTER LAYER

Otto Scharli, Baden, Switzerland, assignor to Aktiengesellschaft Brown, Boveri & Cie., Baden, Switzerland, a joint stock company Filed Jan. 24, 1967, Ser. No. 611,332
Claims priority, application Switzerland, Mar. 11, 1966, 3,558/66
Int. Cl. H01l 3/00, 5/00
U.S. Cl. 317—234 8 Claims

ABSTRACT OF THE DISCLOSURE

Semiconductor structure of the barrier layer type which includes a disc made from crystalline material such as silicon, the disc having established a PN junction therein by application of a doping technique which imparts to the semiconductor structure an asymmetrical current conducting characteristic. A carrier plate such as molybdenum is soldered to one face of the silicon disc and a layer of an alloy containing a doping substance is alloyed onto the opposite face of the disc to establish the PN junction. A perforated sieve-like disc of molybdenum is applied to the outer face of the alloy layer and a similar perforated disc of molybdenum is applied to the outer face of the carrier plate via an intermediate layer of solder. Contact plates having good electrical and heat conductivity characteristics are applied to the opposite faces of the sieve-like molybdenum discs and the whole is then subjected to pressure. The coefficient of thermal expansion of the perforated discs is less than that of the alloy layer and of the solder layer so that the perforated discs are caused to sink into the solder and alloy layers respectively undergoing plastic deformation thus assuring continuous and intimate contact between these elements which imparts good heat and electrical conductivity characteristics to the structure.

BACKGROUND OF THE INVENTION

This invention relates to the art of semiconductor devices and particularly to those of the barrier-layer type which include a disc of crystalline material such as silicon and which incorporates at least one PN junction.

Semiconductor devices of the barrier layer type are known wherein a crystal material, such as a disc of silicon, has applied to one face thereof an alloy containing a doping substance and which is melted into the face of the disc to establish therein a PN junction. A carrier plate of molybdenum, for example, is soldered to the opposite face of the disc. In order to reliably dissipate the amount of heat produced in the semiconductor element while in operation and to ensure constantly good contact with the electrical connections, the semiconductor element is clamped between two contact members having parallel-plane contact surfaces which exert, as far as possible, a uniform pressure over the whole active surface of the semiconductor element. However, the pressure exerted by the contact members cannot be increased indefinitely on account of the danger that the alloying layer will flow away laterally.

To further improve the quality of the contact which must be maintained with the semiconductor element, it has been proposed to join the contact members to the semiconductor element by layers of soft solder which, to a large extent becomes plastic during the time the semiconductor device is in operation carrying current through the same. Because of this plastic condition of the soft solder layers, no appreciable thermal stresses are set up notwithstanding the differing amounts of thermal expansion of the semiconductor element and the contact members. However, some of these soft solders e.g. tin, tend to form a eutectic mixture with the most important of the alloying materials used for doping the silicon, and can therefore be used only to a limited extent for this purpose.

SUMMARY

By means of the present invention, the foregoing disadvantages of the prior art are avoided and this is achieved by incorporation of a perforated sieve-like disc such as molybdenum between at least one of the contact members and the semiconductor element, this perforated disc being caused, by pressure applied by the contact members to sink, during operation of the device, into the adjacent outer layer of the semiconductor element which is undergoing plastic deformaiton, the coefficient of thermal expansion of the perforated disc being lower than those of the layers undergoing deformation. Preferably, two such perforated discs are utilized, one being interposed between one contact member and the metal alloy used for doping the silicon, and the other perforated disc being interposed between the other contact member and the solder layer applied to the underside of the carrier plate whose upper side is soldered to the face of the silicon disc opposite that to which the alloying layer is applied.

BRIEF DESCRIPTION OF THE DRAWING

The accompanying drawing which illustrates a preferred embodiment of the invention is a view in elevation of the improved semiconductor diode structure and with certain parts shown in central section.

DESCRIPTION OF THE PREFERRED EMBODIMENT

With reference now to the drawing, the semiconductor device is seen to be a multi-layer assembly which comprises a disc 1 of crystalline material such as silicon onto one face of which is melted a layer 2 of an alloying material e.g. gold containing a suitable and conventionally known doping substance e.g. antimony which functions to establish a PN junction within the silicon. The alloy layer 2 is bounded by a ring 3 of silicone rubber which is used to protect the edge zone of the disc 1. A molybdenum carrier plate 4 is supplied for the disc 1 and is attached at its upper side to the under side of disc 1 by means of a solder layer 9. A layer of soft solder 5 consisting e.g. of a lead-silver alloy is soldered to the under side of carrier plate 4. A perforated sieve-like molybdenum disc 8 is applied to the upper side of the alloy layer 2 and a similar perforated molybdenum disc 8' is applied to the solder layer 5 at the under side of carrier plate 4. A large area contact member 6 is applied to the upper face of the upper perforated molybdenum disc 8 and a similar contact member 7 is applied to the under face of the lower perforated molybdenum disc 8'. The whole semiconductor assembly thus formed is then subjected to compression in the direction indicated by the arrows. When the semiconductor device is placed in operation, after a short time, the perforated discs 8 and 8' are caused by the pressure to sink into the alloying layer 2 and solder layer 5, respectively. Being made from molybdenum, these discs 8 and 8' exhibit a considerably lower coefficient of thermal expansion than the two layers 2 and 5 undergoing plastic deformation thus ensuring continuous and intimate contact between discs 8, 8' and the material from which the layers 2 and 5 are formed, such material having thus penetrated into the perforations in the discs 8, 8'. For example, the coefficient of thermal expansion of the discs 8, 8' may be less than half that of the layers 2 and 5 which undergo plastic deformation during operation of the semiconductor device and equal to that of the semiconductor disc 1.

The discs 8, 8' are advantageously stamped out and mounted so that the ridge thereon faces the layers 2 and 5.

In order to provide a further improvement in the electrical and mechanical contact between the various discs, the perforations in the discs 8, 8' may be filled, before assembly with the remainder of the components of the semiconductor device, with a metal which is compatible with the material from which the layers 2 and 5 adjacent thereto are formed.

The thickness of the perforated discs 8, 8' is limited, on the one hand, by the permissible thermal resistance, and on the other hand by the requirement of the necessary mechanical strength. Experience has shown that the most favorable thickness for the perforated discs 8, 8' is between the limits 0.05 mm. and 0.2 mm. The most favorable diameters for round perforations in the discs which establish their sieve-like chraacteristic have been found to lie in the range of from 0.2 mm. to 0.8 mm. It is obvious from these dimensions that the scale of the drawing is exaggerated and this has been purposely done so as to enable the invention to be clearly depicted.

I claim:

1. In a semiconductor assembly comprising a disc of semiconductor material such as silicon incorporating at least one PN junction, a carrier plate for said disc, an outer surface constituted by a layer of a material which undergoes plastic deformation during operation of the semiconductor assembly and contact members between which said semiconductor assembly is subjected to pressure, the improvement wherein a perforated metallic and electrically conductive disc is interposed between said deformable layer and the corresponding contact member, said perforated disc having a coefficient of thermal expansion less than that of said deformable layer and being caused by the applied pressure to sink into said deformable layer.

2. A semiconductor assembly as defined in claim 1 wherein the coefficient of thermal expansion of said perforated disc is also substantially equal to that of said semiconductor disc.

3. A semiconductor assembly as defined in claim 1 wherein the coefficient of thermal expansion of said perforated disc is less than half that of said deformable layer.

4. A semiconductor assembly as defined in claim 1 wherein said perforated disc is made from molybdenum and said semiconductor disc is made from silicon.

5. A semiconductor assembly as defined in claim 1 wherein said perforated disc has a thickness in the range of from 0.2 to 0.5 mm. and the perforations therein range in diameter from 0.2 mm. to 0.8 mm.

6. A semiconductor assembly as defined in claim 1 wherein said deformable layer is constituted by an alloy containing a doping substance by which the PN junction is formed.

7. A semiconductor assembly as defined in claim 1 wherein said deformable layer is constituted by a soft solder.

8. A semiconductor assembly as defined in claim 1 wherein both of the outer surfaces thereof are constituted by layers subject to plastic deformation and a perforated disc is interposed between each said layer and the corresponding contact member.

References Cited

UNITED STATES PATENTS

| | | | |
|---|---|---|---|
| 3,249,829 | 5/1966 | Everett et al. | 317—234 |
| 3,280,385 | 10/1966 | Emeis | 317—234 |
| 3,293,509 | 12/1966 | Emeis | 317—234 |

JAMES D. KALLAM, Primary Examiner

S. BRODER, Assistant Examiner